(No Model.)
W. J. McKELVEY.
PIPE HANGER.
No. 428,690. Patented May 27, 1890.
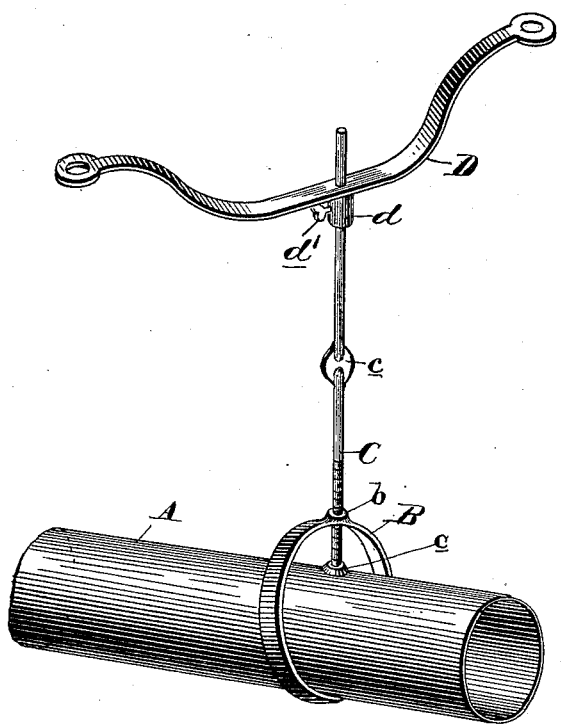
Witnesses:
F. W. Cornwall
Wm. W. Palmer
Inventor:
Wm. J. McKelvey
L. S. Bacon
atty.

UNITED STATES PATENT OFFICE.

WILLIAM J. McKELVEY, OF COLUMBUS, OHIO.

PIPE-HANGER.

SPECIFICATION forming part of Letters Patent No. 428,690, dated May 27, 1890.

Application filed December 21, 1889. Serial No. 334,566. (No model.)

*To all whom it may concern:*

Be it known that I, WILLIAM J. McKELVEY, a citizen of the United States, residing at Columbus, in the county of Franklin and State of Ohio, have invented certain new and useful Improvements in Pipe-Hangers; and I do hereby declare the following to be a full, clear, and exact description of the invention, such as will enable others skilled in the art to which it appertains to make and use the same.

My invention relates to an improvement in pipe-hangers; and it consists in the construction, arrangement, and combination of parts, more fully hereinafter described, and definitely claimed.

The object of my invention is to provide a simple, inexpensive, readily-adjustable, and secure hanger for pipes of varying sizes. I obtain this object by the construction shown in the accompanying drawing, wherein is shown a perspective view of my device with the pipe in place, and in which—

A represents the pipe resting in a solid supporting-ring B, formed of a single piece of metal with a screw-threaded aperature $b$ in its upper side.

C represents a metallic rod, having a screw-threaded lower end, which passes through the aperature in the ring, and has secured thereon a buffer or pressure-plate $c$, which impinges against the upper face of the pipe to lock it in the ring. The rod C is provided centrally with wings $c'$, to form a grasping-surface for the hand when the rod is to be adjusted.

D represents a bracket, formed substantially U-shaped, the end of the arms being perforated to receive suitable bolts or screws for attaching the same to a suitable support. A sleeve $d$ is formed on the under side of the bracket, registering with an opening in the bracket, through which the rod passes. $d'$ is a thumb-screw passing through the sleeve on the bracket, its inner ends coming in contact with the rod C, to retain the rod in the bracket and permit its adjustment.

The bracket D is preferably made of yielding metal, the resiliency of which prevents the jarring of the ceiling or support from being transmitted to the pipe, which would have a tendency to loosen the joints.

In constructing the ring B it is apparent that flexible material may be used, the threaded apertured portion being struck up or enlarged, as shown in the drawing. This will permit a close contact between the pipe and ring being formed both on the bottom and sides in cases where the pipe is smaller than the ring.

Having thus fully described my invention, what I claim, and desire to secure by Letters Patent of the United States, is—

1. In a pipe-hanger, the combination, with a supporting-bracket, a rod adjustably secured thereto having a screw-threaded lower portion, and a buffer on its lower end, of a solid flexible ring having a threaded aperture therein, through which the screw-threaded portion of the rod is passed, substantially as described.

2. In a pipe-hanger, the combination of a flexible U-shaped supporting-bracket, a rod adjustably secured thereto having a threaded lower portion, and a ring through which the threaded portion of the rod passes, substantially as described.

3. In a pipe-hanger, the combination of a supporting-bracket having a sleeve thereon, a set-screw passing through the sleeve, a vertically-adjustable rod secured in the bracket, said rod formed with central wings, a screw-threaded lower end, and a buffer on the lower end of the rod, and a ring formed of a single piece of metal having a threaded aperture in its upper side, through which the threaded portion of the rod is passed, substantially as described.

In testimony whereof I affix my signature in presence of two witnesses.

WILLIAM J. McKELVEY.

Witnesses:
A. A. RUINE,
L. S. JONES.